United States Patent
Hartman et al.

(10) Patent No.: US 12,448,292 B2
(45) Date of Patent: Oct. 21, 2025

(54) SPARK PLASMA SINTERING METHODS FOR FABRICATING DENSE GRAPHITE

(71) Applicants: Battelle Energy Alliance, LLC, Idaho Falls, ID (US); Triad National Security, LLC, Los Alamos, NM (US)

(72) Inventors: Howard T. Hartman, Idaho Falls, ID (US); Benjamin D. Coryell, Idaho Falls, ID (US); Jeffery A. Aguiar, Salt Lake City, UT (US); Colleen V. Shelton-Davis, Pocatello, ID (US); Erik P. Luther, Los Alamos, NM (US)

(73) Assignees: Battelle Energy Alliance, LLC, Idaho Falls, ID (US); Triad National Security, LLC, Los Alamos, NM (US)

( * ) Notice: Subject to any disclaimer, the term of this patent is extended or adjusted under 35 U.S.C. 154(b) by 881 days.

(21) Appl. No.: 17/595,624

(22) PCT Filed: May 20, 2020

(86) PCT No.: PCT/US2020/033781
§ 371 (c)(1),
(2) Date: Nov. 19, 2021

(87) PCT Pub. No.: WO2020/236921
PCT Pub. Date: Nov. 26, 2020

(65) Prior Publication Data
US 2022/0081304 A1  Mar. 17, 2022

Related U.S. Application Data

(60) Provisional application No. 62/850,344, filed on May 20, 2019.

(51) Int. Cl.
| | | |
|---|---|---|
| *C01B 32/21* | (2017.01) | |
| *B28B 3/08* | (2006.01) | |
| *C04B 35/52* | (2006.01) | |
| *C04B 35/645* | (2006.01) | |
| *G21C 3/62* | (2006.01) | |

(52) U.S. Cl.
CPC ............ *C01B 32/21* (2017.08); *C04B 35/522* (2013.01); *C04B 35/645* (2013.01); *G21C 3/62* (2013.01); *B28B 3/086* (2013.01); *C01P 2002/74* (2013.01); *C01P 2004/03* (2013.01); *C01P 2004/04* (2013.01); *C01P 2006/10* (2013.01); *C04B 2235/425* (2013.01); *C04B 2235/6021* (2013.01); *C04B 2235/656* (2013.01); *C04B 2235/666* (2013.01); *C04B 2235/77* (2013.01)

(58) Field of Classification Search
None
See application file for complete search history.

(56) References Cited

U.S. PATENT DOCUMENTS

| | | |
|---|---|---|
| 4,101,453 A | 7/1978 | Orford et al. |
| 4,490,828 A | 12/1984 | Fukuhara et al. |
| 4,847,021 A | 7/1989 | Montgomery et al. |
| 5,882,570 A | 3/1999 | Hayward |
| 7,078,006 B2 | 7/2006 | Okubo et al. |
| 8,048,515 B2 | 11/2011 | Nishiwaki et al. |
| 2004/0188883 A1 | 9/2004 | Barron et al. |
| 2015/0221398 A1 | 8/2015 | Subhash et al. |
| 2017/0369381 A1 | 12/2017 | Chu et al. |
| 2019/0288133 A1 | 9/2019 | Noyes |
| 2019/0322056 A1 | 10/2019 | Noyes |

FOREIGN PATENT DOCUMENTS

| | | | | |
|---|---|---|---|---|
| CN | 106927832 A | * | 7/2017 | |
| CN | 108706984 A | * | 10/2018 | ............. C04B 35/58 |
| CN | 109133965 A | * | 1/2019 | ........... C04B 37/021 |
| CN | 109133966 A | * | 1/2019 | ........... C04B 37/021 |
| CN | 108046774 B | * | 11/2020 | ............. C04B 35/14 |
| EP | 1876249 A1 | | 1/2008 | |
| EP | 2147985 A1 | | 1/2010 | |
| EP | 2213756 A1 | | 8/2010 | |
| JP | 1994-190731 A | | 7/1994 | |
| JP | 2009-001613 A | | 1/2009 | |
| JP | 2018-504340 A | | 2/2018 | |
| KR | 10-2008-0025092 B1 | | 4/2008 | |
| WO | 2006/103798 A1 | | 10/2006 | |
| WO | 2009/051094 A1 | | 4/2009 | |
| WO | 2009/066082 A1 | | 5/2009 | |
| WO | 2012/165208 A1 | | 12/2012 | |

(Continued)

OTHER PUBLICATIONS

Rubinkovskii et al. Production of Aluminum-Graphite Composite by Spark Plasma Sintering. Glass and Ceramics, vol. 76,. Nos. 1-2 (Year: 2019).*
Allabergenov et al. Fabrication of copper-graphite composites by spark plasma sintering and its characterization. Ceramic Transactions 232:151-161 (Year: 2012).*
Japanese Notice of Reasons for Refusal for Japanese Application No. 2021-569043, dated Nov. 22, 2022, 8 pages with English translation.
Bagin, "Critical Technology Assessment: Fine Grain, High Density Graphite," U.S. Department of Commerce, Bureau of Industry and Security, Office of Technology Evaluation, (Apr. 2010), 21 pages.
Borrell et al., "High Density carbon materials obtained at relatively low temperature by spark plasma sintering of carbon nanofibers" Int. J. Mat. Res., vol. 101(1), Jan. 2010, pp. 112-116.

(Continued)

*Primary Examiner* — Tanisha Diggs
(74) *Attorney, Agent, or Firm* — TraskBritt

(57) ABSTRACT

Various embodiments of the disclosure provide methods using spark plasma sintering (SPS) at moderate temperatures and moderate pressures to fabricate high-density graphite material. The moderate temperatures may be temperatures not exceeding about 1200° C. The moderate pressures may be pressures not exceeding about 300 MPa. The high density exhibited by the resulting, sintered, high-density graphite material may be greater than about 1.75 g/cm$^3$ (e.g., greater than about 2.0 g/cm$^3$).

18 Claims, 8 Drawing Sheets

(56) References Cited

FOREIGN PATENT DOCUMENTS

WO 2020/236921 A 11/2020

OTHER PUBLICATIONS

Ge, "Processing of Uranium Dioxide Nuclear Fuel Pellets Using Spark Plasma Sintering", A dissertation presented to the graduate school of University of Florida in partial fulfillment of the requirements for the degree of Doctor of Philosophy, University of Florida, (2014), 159 pages.

Hausner, "Modern Developments in Powder Metallurgy", vol. 3, Development and Future Prospects, Nuclear Applications, (1966) 68 pages.

International Search Report for International Application No. PCT/US2020/033781, mailed Oct. 1, 2020, 2 pages.

International Written Opinion for International Application No. PCT/US2020/033781, mailed Oct. 1, 2020, 5 pages.

Ironman et al., "Exploration of Viability of Spark Plasma Sintering for Commercial Fabrication of Nuclear Fuel Pellets," Nuclear Technology, vol. 200, (Nov. 2017), pp. 144-158.

Maniere et al., "Spark Plasma Sintering and Complex Shapes: The Deformed Interfaces Approach", Powder Technology, vol. 320, (Oct. 2017), pp. 340-345.

POCO Graphite an Entegris Company, "Properties and Characteristics of Graphite", For industrial applications, (Jan. 2015), 42 pages.

Japanese Second Notice of Reasons for Refusal for Japanese Application No. 2021-569043, dated Mar. 29, 2023, 9 pages with English translation.

European Extended Search Report and Opinion for European Application No. 20810560.1, dated May 31, 2023, 6 pages.

Japanese Fourth Notice of Reasons for Refusal for Japanese Application No. 2021-569043, dated Jan. 12, 2024, 5 pages with English translation.

Japanese Notice of Reasons for Refusal for Japanese Application No. 2021-569043, dated Oct. 19, 2023, 4 pages with English translation.

[Online] "Resources, Education, Graphite 101, Structural Description", Asbury Carbons, 2025. Retrieved on Apr. 11, 2025 from the Internet: <URL: https://www.asbury.com/resources/education/graphite-101/structural-description/#:~:text=Graphite%20is%20composed%20of%20layers,(without%20the%20hydrogen%20atoms> (4 pages).

[Online] "What are Carbon Nanotubes? Uses, Properties and Structure", Ossila Enabling Science, 2009. Retrieved on Apr. 11, 2025 from the Internet: <URL: https://www.ossila.com/pages/what-are-carbon-nanotubes>, (8 pages).

Berger et al., EELS Analysis of Vacuum Arc-Deposited Diamond-Like Films, Philosophical Magazine Letters, vol. 57, Issue 6, (1988), pp. 285-290.

Egerton, R.F., "Electron Energy-Loss Spectroscopy, in: In the Electron Microscope", 2nd Ed, Plenum Press, 1996, Chapters 4 & 5, 157 pages.

Garvie et al., Carbonaceous Materials in the Acid Residue from the Orgueil Carbonaceous Chondrite Meteorite, Meteoritics & Planetary Science vol. 41, No. 4, (2006), pp. 633-642.

Garvie, Laurence A. J., Surface Electronic States of Meteoritic Nanodiamonds, Meteoritics & Planetary Science, vol. 41, No. 5, (2006), pp. 667-672.

Ponsonnet et al., EELs Analysis of Hydrogenated Diamond-Like Carbon Films, Thin Solid Films, vol. 319, (1998), pp. 97-100.

\* cited by examiner

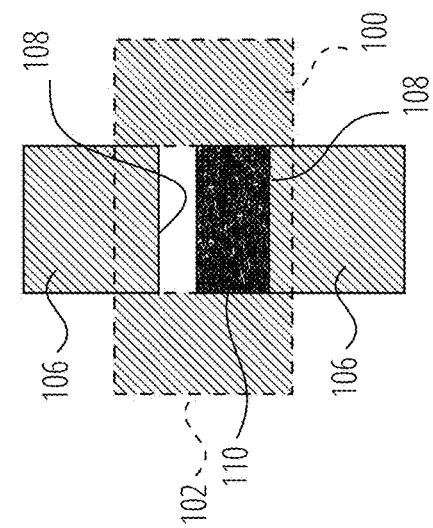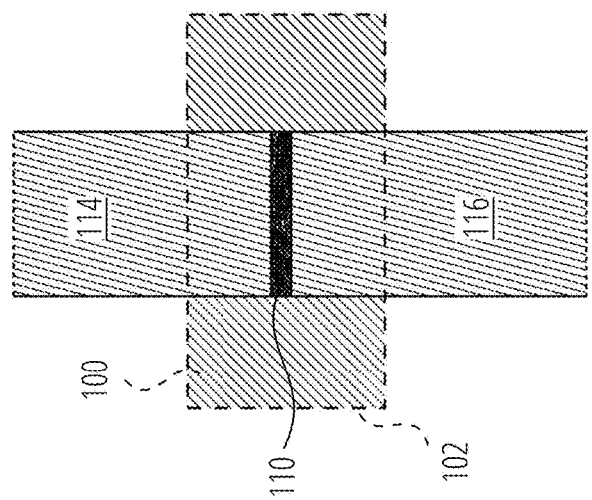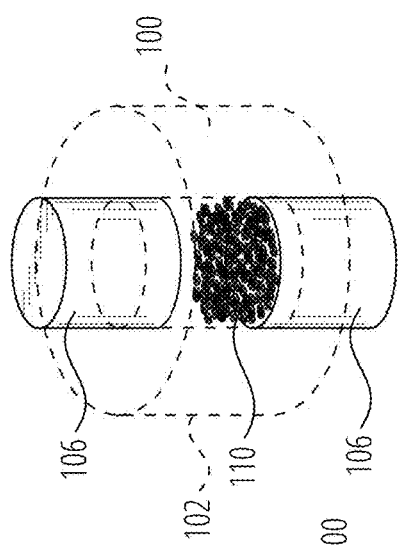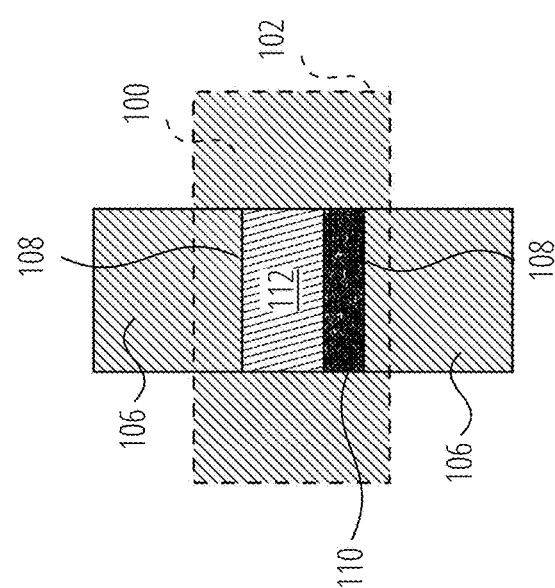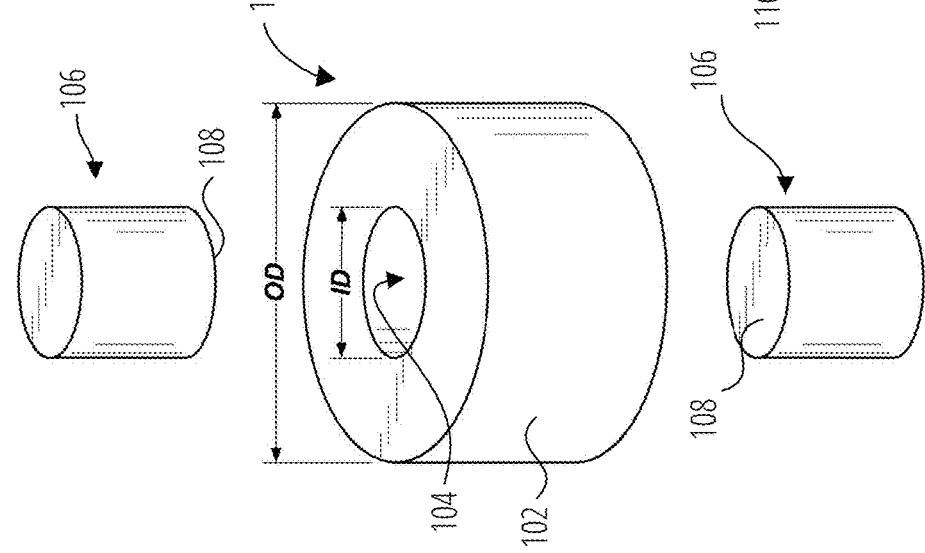

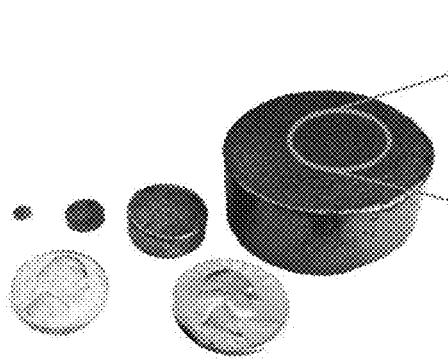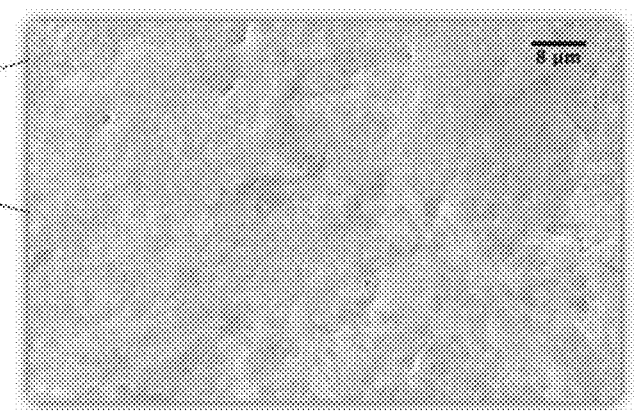
FIG. 4A  FIG. 4B
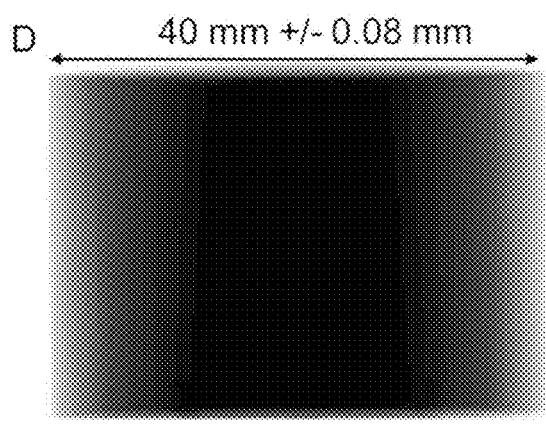
FIG. 4C
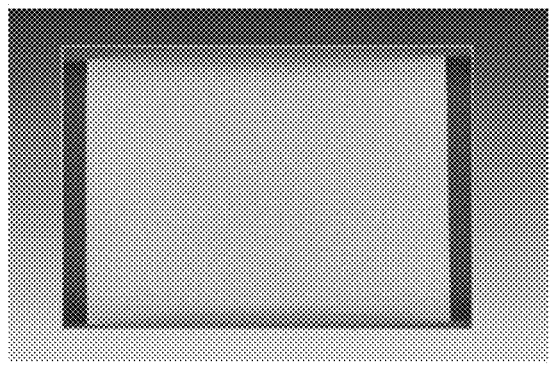 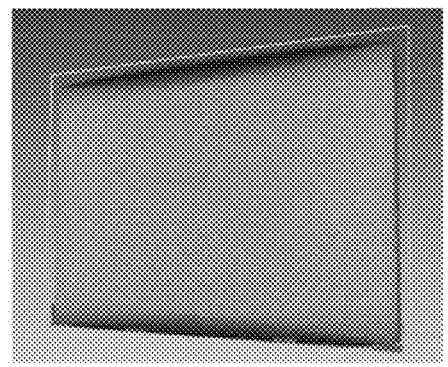
FIG. 4D  FIG. 4E

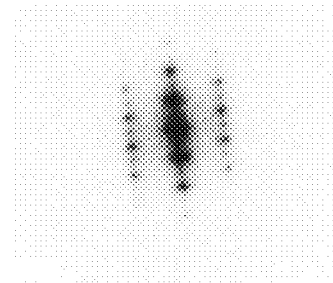
FIG. 6J
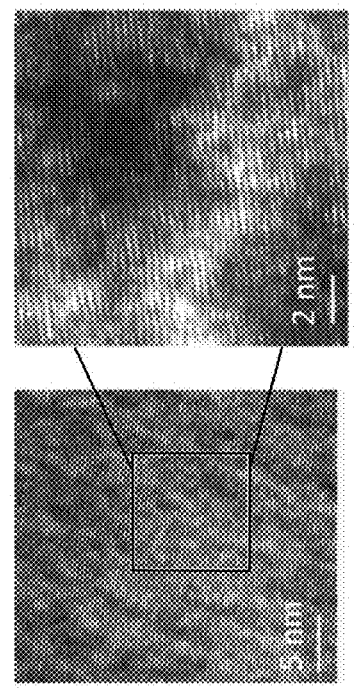
FIG. 6H
FIG. 6F
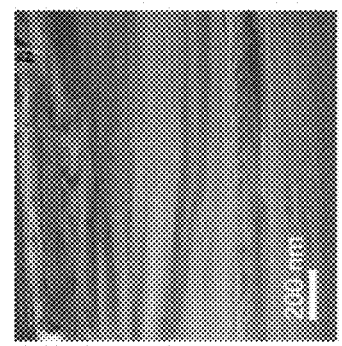
FIG. 6D
FIG. 6B
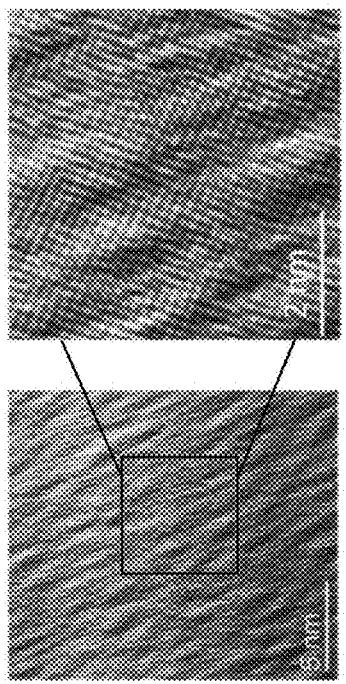
FIG. 6I
FIG. 6G
FIG. 6E
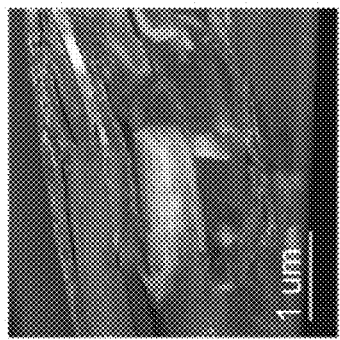
FIG. 6C
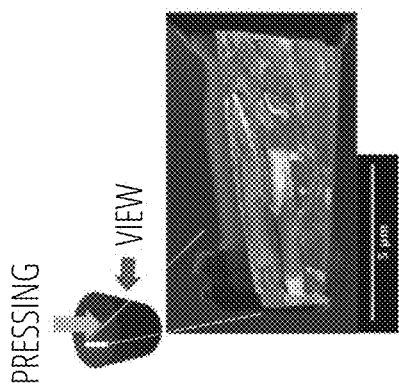
FIG. 6A

SPARK PLASMA SINTERING METHODS FOR FABRICATING DENSE GRAPHITE

CROSS-REFERENCE TO RELATED APPLICATIONS

This application is a national phase entry under 35 U.S.C. § 371 of International Patent Application PCT/US2020/033781, filed May 20, 2020, designating the United States of America and published as International Patent Publication WO 2020/236921 A1 on Nov. 26, 2020, which claims the benefit under Article 8 of the Patent Cooperation Treat to U.S. Provisional Patent Application Ser. No. 62/850,344, filed May 20, 2019, for "Spark Plasma Sintering Methods for Fabricating Dense Graphite."

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

The disclosure, in various embodiments, relates generally to fabrication of graphite at high density (greater than about 1.75 g/cm$^3$ (e.g., greater than about 2.0 g/cm$^3$)). More particularly, this disclosure relates to methods for fabricating high-density graphite (e.g., graphite structures, graphite joining material) using spark plasma sintering.

BACKGROUND

Graphite—a crystalline allotropic form of carbon (C)—is commonly used in a number of energy and engineering applications. However, many such applications require the graphite material to be high-purity and densified. For example, in the development of energy-generating, energy-storing, and arc-discharging materials, a daunting endeavor is the production and shaping of graphitized materials into electrodes, battery anodes, and high-density graphite-based nuclear fuels and reflectors.

Efforts have been made to fabricate graphite materials—in the form of graphite monoliths or intercalated heterogeneous graphite components. Existing efforts include the use of pressing (e.g., hot pressing, warm pressing, isostatic pressing), extrusion, or other sintering. However, these techniques tend to be limited in their ease of production and costs because of inherent challenges. For example, scaling up conventional techniques to industrial scale tends to require a series of time-intensive steps, such as steps with high temperatures, high pressures, and long annealing times (e.g., several days) to cure final materials, which may or may not fail during the process. These types of challenges encountered with conventional techniques also raise the potential for costly overruns and lost time. Conventional techniques may also require additional treatment of the fabricated materials (e.g., such as additional outgassing treatments) to ready the produced high-density, pure graphite materials or components for their intended applications. Moreover, conventional techniques may form graphite materials that suffer a loss in density after fabrication. And, with respect to conventional pressure-assisted techniques for forming dense graphite materials, the machinery used in the techniques often cannot readily be adjusted for use with other materials (e.g., materials other than graphite) without significant investment and retooling to address differences in temperature and fabrication setup. For at least these reasons, forming high-density graphite structures continues to present challenges.

BRIEF SUMMARY

Various embodiments of the disclosure provide methods using spark plasma sintering (SPS) at moderate temperatures and moderate pressures to fabricate high-density graphite structures.

In some embodiments, disclosed is a method for fabricating a high-density graphite structure. The method comprises subjecting a raw material comprising graphite to an electrical current, a temperature not exceeding about 1200° C., and a pressure not exceeding about 300 MPa to sinter the raw material into a high-density graphite structure exhibiting a density of greater than about 1.75 g/cm$^3$ (e.g., greater than about 2.0 g/cm$^3$).

BRIEF DESCRIPTION OF THE DRAWINGS

FIG. 1A is a front and top perspective illustration of a die and corresponding inserts for use in method embodiments of the disclosure.

FIG. 1B is a front and top perspective illustration of the die and corresponding inserts of FIG. 1A during a stage of a method, in accordance with embodiments of the disclosure, wherein a raw material comprises graphite flakes and the die is illustrated in broken line for ease of illustration.

FIG. 1C is a cross-sectional, elevational illustration of the components and materials illustrated in FIG. 1B.

FIG. 1D is a cross-sectional, elevational illustration of the die and corresponding inserts of FIG. 1A during a stage of a method, in accordance with embodiments of the disclosure, wherein a raw material comprising graphite flakes is being sintered to form a graphite structure joined to another structure.

FIG. 1E is a cross-sectional, elevational illustration of the die of FIG. 1A during a stage of a method, in accordance with embodiments of the disclosure, wherein a raw material comprising graphite flakes is being sintered to join two other structures via a graphite joint material.

FIG. 4A is a photograph showing a top and front perspective view of densified, sintered graphite structure samples of various sizes, each fabricated according to a method embodiment of the disclosure, and showing conventional U.S. nickel and U.S. quarter coins nearby for perspective.

FIG. 4B is scanning electron microscope (SEM) image showing the microstructure of a densified, sintered graphite structure sample.

FIG. 4C is an elevational, raw, unprocessed tomographic reconstruction for a densified, sintered graphite structure, formable by method embodiments of the disclosure, having a 40 mm diameter and a total height above 30 mm.

FIG. 4D is a cross-sectional, elevational, front view of the reconstruction of FIG. 4C.

FIG. 4E is a cross-sectional, elevational, angled view of the reconstruction of FIGS. 4C and 4D.

FIG. 6A is a STEM, high-resolution image of a cross-section of a densified, sintered graphite structure, fabricated according to method embodiments of the disclosure, the image taken from a viewpoint perpendicular to the direction of pressing.

FIG. 6B is a STEM, high-resolution image of a cross-section of a densified, sintered graphite structure, fabricated according to method embodiments of the disclosure, the image taken from a viewpoint parallel to the direction of pressing.

FIG. 6C is a STEM, high-resolution image of a cross-section of the densified, sintered graphite structure of FIG. 6A, from the same viewpoint as in FIG. 6A but at a higher resolution than that of FIG. 6A.

FIG. 6D is a STEM, high-resolution image of a cross-section of the densified, sintered graphite structure of FIG. 6B, from the same viewpoint as in FIG. 6B but at a higher resolution than that of FIG. 6B.

FIG. 6E is a STEM, high-resolution image of a cross-section of the densified, sintered graphite structure of FIGS. 6A and 6C, oriented to a preferred [002] direction and at a higher resolution than that of FIG. 6C.

FIG. 6F is a STEM, high-resolution image of a cross-section of the densified, sintered graphite structure of FIGS. 6B and 6D, from the same viewpoint as in FIG. 6B, but at a higher resolution than that of FIGS. 6B and 6D.

FIG. 6G is an enlarged view of the area boxed in FIG. 6E.

FIG. 6H is an enlarged view of the area boxed in FIG. 6F.

FIG. 6I shows an elective area electron diffraction of the densified, sintered graphite structure of FIG. 6A, from the same viewpoint as in FIG. 6A.

FIG. 6J shows an elective area electron diffraction of the densified, sintered graphite structure of FIG. 6B, from the same viewpoint as in FIG. 6B.

DETAILED DESCRIPTION

Figure 2:
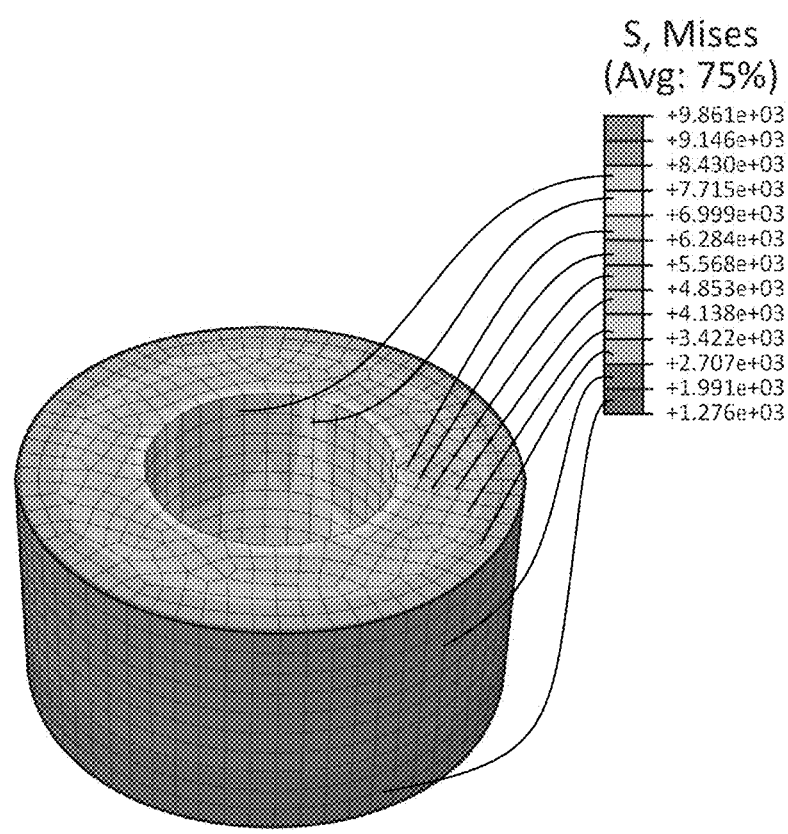
FIG. 2 shows a computer-aided design for a die, such as the die of FIG. 1A through FIG. 1E, that may be used in method embodiments of the disclosure.

Disclosed are methods by which graphite masses (e.g., graphite monoliths, graphite bonding materials) may be formed to exhibit high purity, high density, and low structural defects. The methods may be low cost and enable a high rate of reproducibility and scaling. Embodiments of the methods include using spark plasma sintering (SPS) to densify graphite to high density. The methods may use moderate temperatures (e.g., below about 1200° C.) and moderate pressures (e.g., less than about 300 MPa).

As used herein, the term "high density," when referring to graphite, means and includes graphite exhibiting a density of greater than about 1.75 g/cm$^3$ (e.g., greater than about 2.0 g/cm$^3$).

As used herein, the terms "sintered graphite," "densified graphite," and "sintered, densified graphite," are equivalent and interchangeable terms and refer to a graphite material resulting from an SPS process according to embodiments of the disclosure.

As used herein, the terms "spark plasma sintering (SPS)," "SPS technique," "SPS method," and "electrical field assisted sintering (EFAS)" are equivalent terms that may be used interchangeably. Other terms equivalent and interchangeable with the aforementioned terms are "spark sintering," "electrical-current-induced sintering," "field assisted sintering technique (FAST)," and "pulsed electric current sintering (PECS)." (It should be noted by the reader that, though the term "spark plasma sintering" includes the word "plasma," a plasma material may not necessarily be used or generated in the SPS process).

SPS presents a viable alternative to problematic conventional techniques for forming graphite materials or structures with high density, high purity, and low defects. Using SPS techniques, according to embodiments of the disclosure, may require far fewer steps and lower costs compared to conventional techniques. For example, compared to conventional pressing techniques, the SPS methods of embodiments of the disclosure may be faster (e.g., enabling a greater per-time throughput), may necessitate fewer or no subsequent processes (e.g., may not require debinding (e.g., removal of binder additives)), and may necessitate fewer or no additives to achieve a desired high-density graphite structure. Moreover, unlike conventional techniques, the tool used to densify the graphite by the SPS methods of the disclosure may be tooling conducive for sintering materials other than graphite without extensive reconfiguration of the tooling.

SPS techniques, in accordance with the disclosure, involve applying a combination of pressure and electrical current (e.g., pulsed or unpulsed direct current (DC) or alternating current (AC)) to a "raw" (e.g., "feed") material in a controlled environment (e.g., an environment in which pressure and temperature are controllable). The application of the electrical current generates heat internally within the material. In some embodiments, external heat may also be applied to the raw material within the controlled environment.

The electrical current applied in SPS processes, according to embodiments of the disclosed methods, may be in the range of 500 amperes (500 A) to 10,000 amperes (10,000 A). The electrical current may be applied (e.g., applied directly) to a die holding the raw material during the SPS process.

In some embodiments, the electrical current may be applied by subjecting the raw material, and the die, to an applied electric field. The applied electric field may be about 4 V/cm or more (e.g., about 4 V/cm to about 20 V/cm).

As used herein, the terms "raw material" and "feed material" mean and include a solid material not yet at a desired densified state. The "raw material" (or, equivalently the "feed material") may comprise a collection of loose (e.g., flowable) solid powder, solid particles, solid flakes, or other solid small masses. In some embodiments, the "raw material" (or, equivalently the "feed material") may have previously been subjected to sintering without yet having formed a monolith structure exhibiting the desired density.

The raw material used in the embodiments of the disclosure may include unprocessed carbon-based powders or previously-sintered carbon-based (e.g., graphite-based) components. In some embodiments, the raw material may comprise, consist essentially of, or consist of graphite flake material. Graphite flake material is generally considered a highly-abundant, naturally-formed material. Therefore, the raw material costs contribute to the methods being relatively low cost.

In embodiments in which the raw material comprises particles of solid material, the raw material may comprise a mixture of particles (e.g., flake) sizes (e.g., largest outer dimension). Alternatively, the raw material may comprise, consist essentially of, or consist a grouping of particles of substantially consistent size. In some embodiments, the raw material may be provided as a mixture of particle sizes, which may minimize formation of pores in the fabricated structure. With multiple particle sizes, smaller particles (e.g., smaller flakes) may function to fill-in what would otherwise be voids in the interstitial space between larger particles (e.g., larger flakes).

In some embodiments, the method may include compacting the raw material (e.g., the particles (e.g., flakes) of the raw material) in the die prior to initiation of the SPS technique, e.g., prior to application of current. Compacting the raw material before the SPS may promote forming the graphite structure with no or minimal pores. In embodiments in which the raw material comprises a mixture of particle (e.g., flake) sizes, compacting the raw material prior to SPS may encourage the particles of the smaller sizes to take up position in the interstitial spaces between particles of larger sizes. In other embodiments, the method may not include compacting the raw material before the SPS process. Nonetheless, the environment may be controlled, e.g., by selecting and controlling the heating rate and pressure schedule to tailor the density of the resulting graphite structure. In some embodiments, a vacuum atmosphere may be used.

The sintering conditions (e.g., temperature, pressure) used in the SPS methods of the disclosure may be at "moderate conditions," i.e., at "moderate temperatures" (e.g., temperatures not exceeding about 1200° C.) and at "moderate pressures" (e.g., pressures not exceeding about 300 MPa). These moderate conditions contribute to the low cost of the technique relative to conventional graphite-densification techniques. That is, in contrast, densifying graphite by a conventional technique may use "high conditions" (e.g., high temperatures (e.g., temperatures in excess of 2000° C.) and/or high pressures (e.g., pressures in excess of about 300 MPa)). For example, a hot-pressing technique may use a temperature of about at least 2800° C. (e.g., about 2800° C. to about 3000° C.). As another example, a hot isostatic processing (HIP) technique may use a temperature of 2200° C., a pressure (e.g., argon pressure) of 206.8 MPa, and a long processing time of two hours to produce graphite with a bulk density of 2.10 g/cm$^3$.

Embodiments of the SPS methods of the disclosure—which methods may avoid use of high temperatures and high pressures—may also avoid use of binders, resin additives, and/or post-thermal treatments. In contrast, densifying graphite by a conventional technique, such as warm pressing, often includes the addition of additives, resins, and/or tar pitches to produce a densified block with graphite-like properties. Therefore, even though conventional "warm" pressing may be conducted at more moderate conditions than conventional "hot" pressing (e.g., hot isostatic processing (HIP)), the warm pressing technique is not without its own challenges. For example, warm pressing may be used to densify graphite in conjunction with using organic-containing additives, which additives must escape from the graphite structure; however, while escaping, the additives may tend to compromise the integrity of the graphite structure, such as by cracking the material or forming pores in the material.

In some embodiments, raw material to be sintered may include inert material(s) in addition to the graphite raw material. Such additional inert material(s) may include one or more metals or metal alloys not chemically reactive with the graphite (e.g., zirconium (Zr), nickel (Ni), iron (Fe), chromium (Cr) (e.g., to form a solid mixture of graphite with the metal or metals)), and/or one or more oxide materials not chemically reactive with the graphite (e.g., one or more nuclear fuel oxide materials (e.g., uranium oxide $UO_2$ and/or $UO_3$) and/or plutonium oxide ($PuO_2$))).

In some embodiments, raw material to be sintered may include so-called "reactive" material(s), i.e., materials selected or otherwise formulated to form, with the graphite, a carbide material during the sintering.

Embodiments of the SPS methods of the disclosure may also include relatively few steps to fabricate a graphite structure with high density. For example, in some embodiments, a high-density graphite structure may be formed by only one "run" of the raw material through the SPS process (e.g., one session of applying current and pressure, and, optionally, external heat to the raw material, or, rather, the die containing the raw material). In other embodiments, more than one run of the SPS process may be carried out (e.g., the raw material may be sintered by the SPS process to form a first densified structure, and the first densified structure may be sintered by the SPS process again to form a second densified structure, etc., until the desired density is achieved). In contrast, conventional pressing techniques—such as warm pressing and hot pressing—usually require several more steps, such as powder pulverization, stepped granulation, pressing, and finally heat treatment to achieve a high-density structure.

The resulting fabricated graphite structure or material, formed by methods of the disclosure, may exhibit high density, such as near full densification. For example, fabricated graphite structures or materials may exhibit a graphite density of greater than about 1.75 g/cm$^3$ (e.g., greater than about 2.0 g/cm$^3$ (e.g., about 2.095 g/cm$^3$, greater than about 2.1 g/cm$^3$, e.g., about 2.2 g/cm$^3$)).

In some embodiments, the densified graphite structures (e.g., solid structures) or materials may be formed to significant dimensions (e.g., graphite cylinder structures with diameters of at least about 50 mm and equal or greater heights).

By embodiments of the disclosed methods, the raw material may be fully sintered with minimized defects in the microstructure (e.g., the crystallinity) of the material, forming densified graphite structures with the relatively-large greatest outer dimension (e.g., 50 mm or greater), while also achieving high density and high purity. In contrast, conventional techniques (e.g., pressing) to form densified graphite structures at such larger dimensions may not achieve such high densities as achievable by the present SPS techniques.

With reference to FIG. 1A, illustrated is a die 100 that includes a cylindrical wall 102 defining an opening 104 in which a raw material may be received and held during an SPS process. In some embodiments, such as those illustrated in FIGS. 1B through 1E, a raw material 110 (e.g., comprising graphite) may also be received and held during a compaction stage, which may precede the SPS process. The opening 104 may continue all the way through the die 100 to the bottom side (not visible in FIG. 1) of the die 100.

In some embodiments, such as that illustrated in FIG. 1A, the opening 104 of the die 100 defines a cylindrical shape, which is the shape to which a resulting densified graphite structure will conform. An outer diameter OD of the die 100 may be 4 inches (10.16 cm), and an inner diameter ID of the die 100 may be 2 inches (5.08 cm). Therefore, in some embodiments, the outer diameter OD of the die 100 may be twice the inner diameter ID of the die 100.

In other embodiments, the opening of the die may be differently shaped, including with non-conventional shapes, to form the densified graphite structure with a desired shape.

In at least some embodiments, the die 100 may be paired with a corresponding insert 106 for each end of the opening 104. Each insert 106 may be similarly or differently shaped. Together, the die 100 and the inserts 106 may be referred to herein as a "die set."

Each insert 106 may have a surface (e.g., face 108) defining a shape that may be snugly received within the opening 104 of the die 100. For example, if the inner diameter ID of the die 100 is 2 inches (5.08 cm) (i.e., if the width of the opening 104 is 2 inches (5.08 cm)), an outer diameter of at least the face 108 of the insert 106—and, in some embodiments, the outer diameter along a whole height of the insert 106—may be almost 2 inches (5.08 cm) (e.g., within about 0.005 inches (0.127 mm)), such that each insert 106 is snugly receivable within its respective end of the opening 104 and configured to compact the raw material 110 within the opening 104 from the opposite ends of the opening 104. Such a die (e.g., die 100) may be configured to produce a design with a peak stress at 9.861 ksi (67.99 MPa). During the SPS process, the inserts 106 are retained within their respective ends of the opening 104, enclosing the raw material 110 within the opening 104 of the die 100.

For example, with reference to FIG. 1B and FIG. 1C, the raw material 110 (e.g., graphite flakes) may be received within the opening 104 (FIG. 1A) within the cylindrical wall 102 of the die 100, with one of the inserts 106 below and another of the inserts 106 above. The inserts 106 may be the brought closer together within the die 100 to compress the raw material 110 and to contain the raw material 110 during the SPS process.

In some embodiments, the face 108 of each of, or either of, the inserts 106—i.e., the surface of the insert 106 that is directed toward the raw material 110 when the insert 106 is received in the opening 104—may be planar, so as to be used to form a densified graphite structure with a planar surface as its upper surface (e.g., in embodiments in which the face 108 of the upper one of the inserts 106 is planar), its lower surface (e.g., in embodiments in which the face 108 of the lower one of the inserts 106 is planar), or as both its upper surface and lower surface (e.g., in embodiments in which the faces 108 of both the inserts 106 are planar). In other embodiments, the face 108 of each of, or either of, the inserts 106 may be nonplanar (e.g., convex, concave, or defining another type of topography) to be used to form a densified graphite structure with an upper and/or lower non-planar surface of a corresponding shape to the respective face 108 of the inserts 106.

The die 100 and, in some embodiments, one or both of the inserts 106 may be formed of an electrically conductive material selected and formulated to, and the die 100 designed and formed to, provide strong protection to the raw material 110 during the SPS process. For example, in some embodiments, the die 100 and, in some such embodiments, the inserts 106 may comprise, consist essentially of, or consist of tungsten carbide (WC).

In embodiments of the methods of the disclosure, the raw material 110 may be received and held within the opening 104 of the die 100 (e.g., as illustrated in FIG. 1B and FIG. 1C), the inserts 106 may be used to compact the raw material 110 within the opening 104, and then the die 100 and the raw material therein may be subjected to an electrical current (as discussed above), moderate pressure (as discussed above), and, in some embodiments, moderate temperatures (as discussed above). In applying the electrical current, the current may be passed through the conductive material of the die 100 and into the raw material 110 therein. Afterward, a densified graphite structure may be removed from the opening 104.

In some embodiments, the die 100 and the inserts 106 may be used (e.g., subsequently or previously) to densify materials other than graphite or in addition to graphite. For example, the raw material 110 of FIG. 1B and FIG. 1C may be other than graphite flakes or other than graphite flakes alone.

In some embodiments, the die 100 and the inserts 106 may be used to form a structure with sintered graphite joined to another material or structure. For example, with reference to FIG. 1D, another structure 112 (e.g., an already-sintered graphite structure, an already-sintered structure comprising a material other than or in addition to graphite, a graphite structure not yet fully densified, a structure not yet fully densified and comprising a material other than or in addition to graphite, and/or additional particularized material) may be received within the opening 104 along with the raw material 110, In some such embodiments, the other structure 112 may comprise one or more metals (e.g., iron (Fe), chromium (Cr), nickel (Ni), or combinations of any thereof) alone or in combination. The raw material 110 may be disposed below the other structure 112, as illustrated in FIG. 1D. In other embodiments, the raw material 110 may be disposed above, around, within, or dispersed throughout the other structure 112. The inserts 106 may be used to apply an axial compression to (e.g., to axially compress) that which is received within the opening 104, i.e., the other structure 112 and the raw material 110, before and/or during subjecting the die set and the materials within (e.g., the raw material 110 and the other structure 112) to the SPS process. The final, sintered structure may therefore comprise a unified, dense structure with the raw material 110 forming a densified graphite material joined to the other structure 112.

In some embodiments, the SPS process may be used, with the die 100, to join two other structures via a joint material (e.g., graphite) sintered within the die 100. For example, with reference to FIG. 1E, the raw material 110 may be disposed in the opening 104 (FIG. 1A) of the die 100 between a first structure 114 and a second structure 116, with opposing ends of the first structure 114 and the second structure 116 received within the opening 104 (FIG. 1A) of the die 100. The first structure 114 and the second structure 116 may extend out of the opening 104 (FIG. 1A) and above and below, respectively, the die 100. The SPS process may then be carried out to sinter the raw material 110, to form a sintered material (e.g., sintered graphite material) that bonds the first structure 114 and the second structure 116 with the sintered material therebetween. After completing the SPS process, the die 100 may be removed from the area of the bond (e.g., the sintered material formed from the raw material 110) by, e.g., sliding the die 100 along and off a distal end of one or the other of the first structure 114 or the second structure 116. In other embodiments, portions of the die 100 may be physically separated (e.g., cut, opened) to remove the die 100 from the bonded area (e.g., the sintered material formed from the raw material 110).

Accordingly, the methods, die sets, and/or the components thereof, may be used to form sintered materials or structures, such as singular monolith sintered structures of graphite or graphite-including material, densified structures of graphite or graphite-including material, structures that include sintered material joined to another structure, and/or structures that include more than one structure or material joined to another structure or material via a sintered material (e.g., a sintered graphite material as a joint material between two other, previously-separate structures). The sintered material (e.g., sintered graphite material, sintered graphite-including material, or other sintered material) may be substantially dense and nonporous (e.g., less than about 1 vol. % void space), In embodiments in which the raw material 110 comprises, consists essentially of, or consists of graphite flakes, the resulting sintered graphite structure may be substantially anisotropic in microstructure. In such embodiments, graphite grains may be substantially perpendicularly disposed, relative to the direction of axial compression used during the SPS process.

The illustrations presented herein are not meant to be actual views of any particular apparatus, but are merely idealized representations that are employed to describe embodiments of the disclosure.

EXAMPLES

Forming a Sintered Graphite Structure by SPS (Electrical Field Assisted Sintering):

Electrical field assisted sintering was performed using a Fuji MK-IV sinter at California Nanotechnologies, Inc. The sintering equipment was equipped with a customized die configuration. Pending on the final shape concerns, a custom tungsten carbide outer die was used, engineered with at least a safety factor of two (2) considering both the mechanical and thermal hoop stresses induced during heating and pressing. To maximize the utility of the outer die set, inserts were engineered to provide both net shape control and to match the thermal expansion of anisotropic graphite powder (e.g., the raw material). Fabrication of this customized die set was non-trivial, requiring several machining and test runs to minimize stress concentrators and mitigate significant risks associated with reliability caused by non-uniformities in production, where pending stresses were calculated and visualized inside of the Abaqus engineering software package.

With reference to FIG. 2, shown is a computer-aided design for a die (e.g., the die 100 of FIG. 1) and finite element modeling. The shown die is configured for assisting in the compaction and graphitization of graphite. The shown design is an example of a die design with an inner diameter ID (FIG. 1) of 2 inches (5.08 cm) and an outer diameter OD (FIG. 1) of 4 inches (10.16 cm), which produces a die 100 (FIG. 1) with a safety factor of approximately 2.35 with a peak stress at 9.861 ksi (67.99 MPa).

Using the die set, differences in the loading and sintering conditions were applied. In the case of using a tungsten carbide die 100 (FIG. 1), pressure was first applied followed by a temperature hold up to 700° C.

Feed stock material (i.e., the "raw material") was natural graphite powder flake grade 3482 provided the Asbury Carbons. The carbon flake properties contained 99.818%±0.182% carbon with a pressed density of 2.12 $g/cm^3$ at 6,500 psi (44.82 MPa) and 2.30 $g/cm^3$ at 32,500 psi (224.08 MPa). The particle size distribution was centered around 62.77% at 200 mesh, followed by 16.15% at 100 mesh (149 microns), 9.06% at 80 mesh (177 microns), 8.68% at 325 mesh (44 microns), and remaining amounts in meshes lower than 100 (149 microns). The flake powder was not treated or processed beforehand. That is, the powder was not subjected to pulverization, coating, or granulation before the sintering. The maximum ash content of the feed stock was less than 3% with a boron equivalency of 3 ppm, where—considering the impurity content—each element was weighted by the boron equivalent cross-section. Given these values, the feed stock was considered a high-grade graphite material with minimal impurity content, especially considering boron.

Figure 3A:
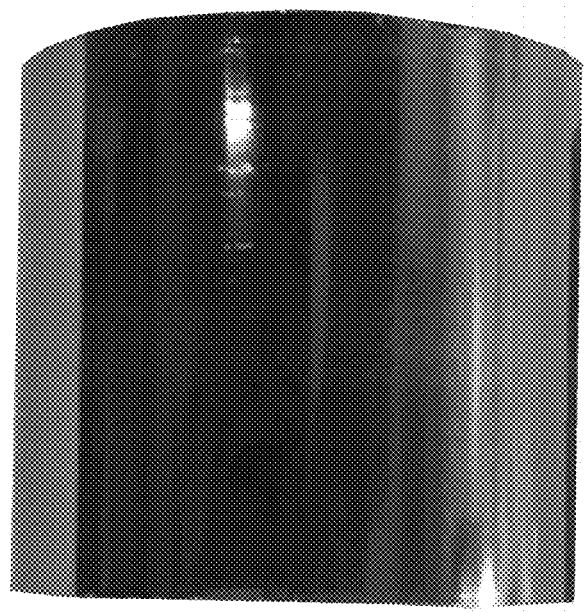
FIG. 3A is a photograph showing an elevational, perspective view of a densified, sintered graphite structure, fabricated according to a method embodiment of the disclosure.

Using the aforementioned feed stock, die, and an SPS process at 200 MPa and 600° C., a densified, sintered graphite structure was form with an outer diameter of 2 inches (5.08 cm) and a height of 1.5 inches (3.81 cm), shown in the photograph of FIG. 3A.

Figure 3B:
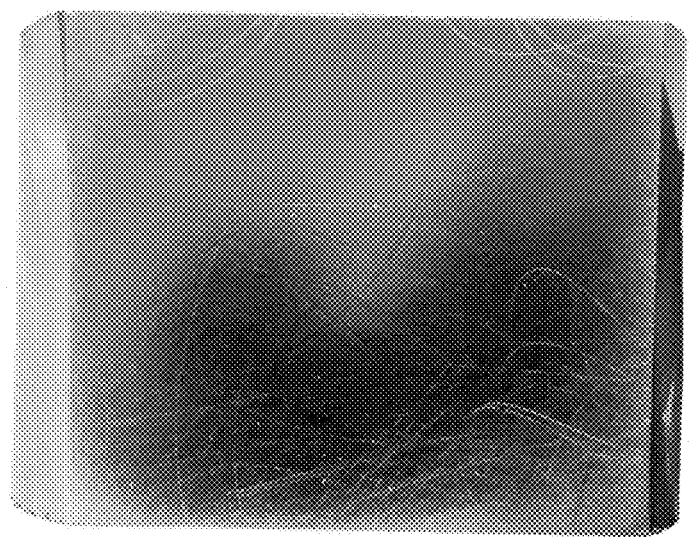
FIG. 3B is a photograph showing an elevational, perspective view of a densified, sintered graphite structure, fabricated according to a method embodiment of the disclosure, and polished to reveal a lack of structural defects within the structure.

FIG. 3B shows a photograph of a densified, sintered graphite structure, such as that of FIG. 3A, after polishing, showing the lack of structural defects, such as cracks, within the structure. Accompanying visual inspection, X-ray tomography was used to inspect the sintered structures, to verify that structures were formed defect-free.

Scanning Transmission Electron Microscopy:

Analytical transmission electron microscopy was performed on an aberration corrected FEI Titan operated at 300 kV. The FET Titan was operated in TEM, STEM, and diffraction modes to capture the underlying microstructure and chemistry associated with as-sintered graphite. Electron scattered images were captured in annular dark and bright field imaging in both STEM and TEM resolving the lattice structure of graphite. Inelastically scattered electrons were passed through an electron transparent sample to form a high angle annular dark field (HAADF) image, which is proportional to atomic mass. Resolving the local chemistry and bonding, the FEI Titan was equipped with a high solid angle windowless Si X-ray detector and Gatan GIF EELS spectrometer with 0.83 eV full-width half-maximum energy resolution based on the as-sampled vacuum zero loss peak with 0.3 eV/pixel dispersion. Atomic image capturing was performed, providing annular dark and bright field images showing the grain to underlying atomic lattice structure of graphite. Simultaneous EELS spectral imaging, capturing the low loss regime and ionization of the oxygen-K at 532 eV and carbon-K at 285 eV, were captured and quantified in detail. The quantification of the C-K near edge fine structure was performed by minimizing effects of thickness using a Fourier-log deconvolution and performing multiple linear least squares peak fitting and subsequent integration to calculate the ratio of sp2 ($\pi^*$) to sp3 ($\sigma^*$) type binding in the as-sintered material. The calculation for the ratio of $\pi^*$ to $\sigma^*$ bonding follows the established methodologies on quantifying the amount of sp2- and sp3-like bonding using integrated windows previously established in the literature. (See A. J. L. Garvie, Surface electronic states of meteoritic nanodiamonds, Meteoritics & Planetary Science. 41 (2006) 667-672. Doi:10.1111/j.1945-5100.2006.tb00982.x; L. A. J. Garvie, P. R. Buseck, Carbonaceous materials in the acid residue from the Orgueil carbonaceous chondrite meteorite, Meteoritics & Planetary Science. 41 (2006) 633-642, doi: 10.1111/j.1945-5100.2006.tb00486.x; S. D. Berger, D. R. McKenzie, P. J. Martin, EELS analysis of vacuum arc-deposited diamond-like films, Philosophical Magazine Letters. 57 (1988) 285-290, doi:10.1080/09500838808214715; L. Ponsonnet, C. Donnet, K. Varlot, J. M. Martin, A. Grill, V. Patel, EELS analysis of hydrogenated diamond-like carbon films, Thin Solid Films. 319 (1998) 97-100, doi: 10.1016/S0040-6090(97)01094-8.) A Gaussian profile was fit to the $\pi^*$ peak, and an integrated window was fit over the $\sigma^*$ peak. Based on integrated areas of each of these features, the relative changes in carbon bonding, as a function of beam position, can be quantified.

Electron-based diffraction was performed, under selected area conditions, to resolve the neighboring atomic lattice structure from both the parallel and perpendicular pressing directions mentioned above. Electron-based diffraction was used to detail along coherent directions, where the sample was oriented to preferred crystallographic orientations within the FEI Titan.

Quantified maps are reported in direct atomic percentages, wherein the relative thickness and specific atomic cross-sections have been used to calculate the atomic mapping. (See R. F. Egerton, Electron Energy-Loss Spectroscopy, in: In the Electron Microscope, $2^{nd}$ Ed, Plenum Press, 1996.) Weighted spectral images were calculated inside Gatan's Digital Micrograph software and visualized using Matlab. Maps were further compared against the accompanying HAADF image, consisting of multiple layers, over which the differences in the concentration and the relative morphology of the sample can be easily visualized.

Neutron-Based Diffraction:

Neutron diffraction of sintered cylinders was performed along all three radial axes where an average scan was collected. To baseline the collected diffraction pattern, a diamond standard was scanned to compare with the collected profile. The pattern was indexed and refined using Rietveld refinement inside the latest GSAS-II software package, implemented based on a graphite crystal structure with the initial lattice parameters a=b 2.456 Å and c=6.696 Å within space group P63mc containing carbon atoms centered at the corner vertices (0, 0, 0) and at (⅓, ⅔, 0) fractional Wycoff coordinate positions.

Non-Destructive X-Ray Radiography:

Nondestructive X-ray radiographs and the x-ray tomography reconstructions were acquired using a µXCT system located at Idaho National Laboratory. The source was a 150 kV microfocus Xray tube with a 7 µm nominal spot size. The detector was a Dexela 2923 NDT cesium iodide flat panel with 75 µm pixel pitch and a 291 mm by 230 mm active area. A rotation stage between the source and detector provided precision rotation, enabling x-ray tomography. The source was operated at 150 kV and 66 µA with a 0.635 mm thick copper filter for acquisition of all projections acquired for this study. The imaging system geometry for this study was determined through µXCT calibration using a calibration specimen (an array of ball bearings separated by 5 mm) and proprietary software provided by North Star Imaging. The source-to-detector distance (695.94 mm), source-to-rotation-axis distance (302.353 mm), and rotation-axis-to-detector distance (393.587 mm) were determined from the calibration. The resulting magnification was 2.3, yielding an effective pixel pitch of 32.6 µm. Projections were acquired every 0.5° for a total of 720 projections, and each projection was an average of two exposures. Tomographic reconstruction was performed using North Star Imaging and MIPAR proprietary reconstruction software. As a principal nondestructive evaluation (NDE) technique, sets of 2-D (two dimensional) radiographs of a 3-D (three dimensional) images were acquired as sintered graphite cylinders were rotated through 360 degrees, generating a 3-D image data set (2-dimensions from the radiograph and the third from the rotation). These 3-D data sets were assembled into a volumetric representation of the sintered graphite cylinders and visualized inside each of the software packages to check for internal cracks and pores prior to additional destructive characterization, specifically STEM and EELS analysis.

EXPERIMENTAL RESULTS

Physical Bulk Measurements of Pressed Graphite Materials:

In stark contrast to the localized measurements made within an analytical scanning transmission electron microscope, data obtained by X-ray diffraction, tomography, and scanning electron microscopy is of a relatively bulk nature, hence the grouping of the aforementioned techniques within this section.

Within a controlled environment, pure natural graphite flake raw material was subjected to an SPS method according to embodiments of the disclosure, with a peak pressure of 300 MPa applied at 700° C. for up to a ten-minute interval, to form fully-densified graphite structures ranging in outer diameter dimension from 5 mm to over 40 mm, shown in the photograph of FIG. 4A.

The microstructures of samples, such as those of FIG. 4A, where inspected along a polish cross-section, shown in FIG. 4B (which may, for example, represent an enlargement of the encircled portion of the largest structure of FIG. 4A). FIG. 4B shows a cross-section over a 40 µm² total area.

It was found that the structures (FIG. 4A) formed by the SPS method exhibited a high-density material structure (e.g., a cylinder) with a density measuring 2.1 g/cm³ upon inspection.

The structural integrity and homogeneity was determined by X-ray based tomography. FIG. 4C shows the raw unprocessed tomographic reconstruction for a 40 mm diameter cylinder measuring over 30 mm in total height. Within the reconstruction presented in FIG. 4C, at this equivalent 20× magnification, there were no signs of voids or cracks that would otherwise inhibit graphitization or present significant voids, cracks, or porosity in the sintered structure. Despite no traces of cracks or voids, orthogonal views in the reconstruction were taken from the raw reconstructed dataset, which views are shown in FIGS. 4D and 4E, respectively. In the two orthogonal directions, there was no presence of internal cracks or voids.

Figure 5:
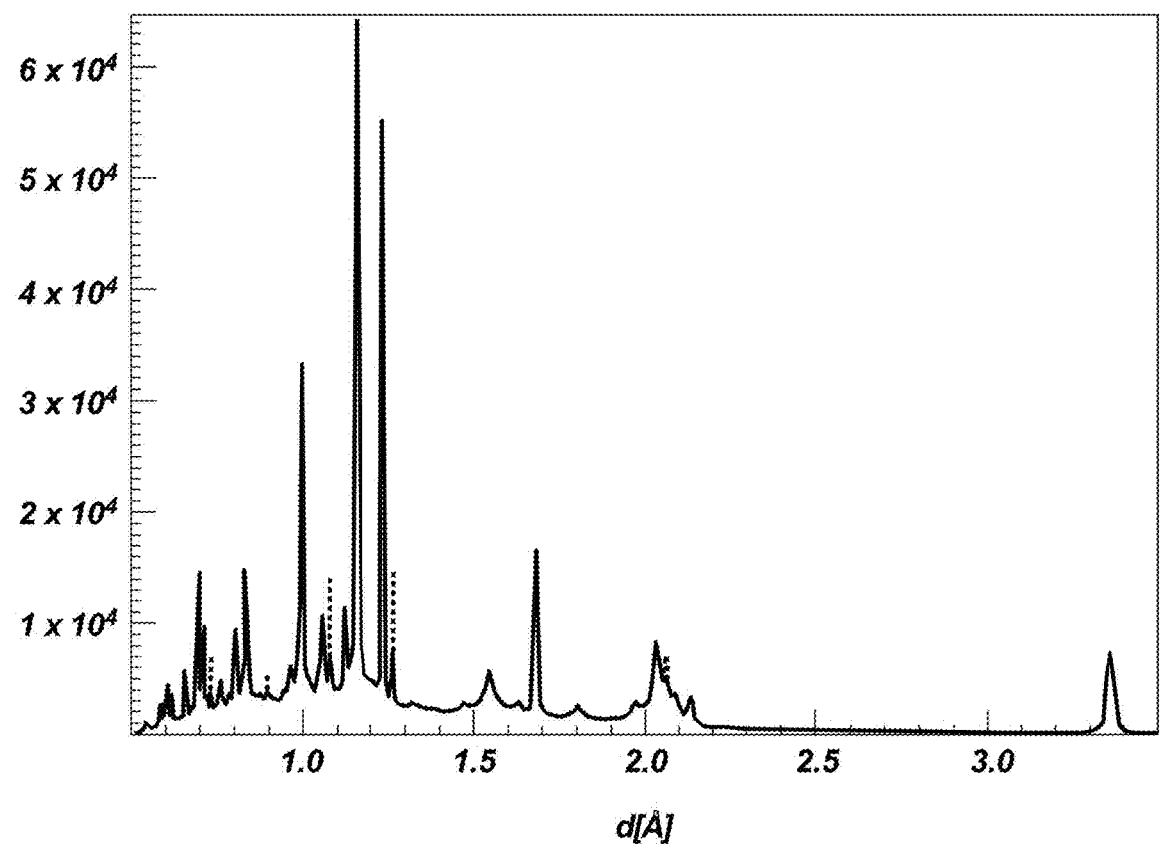
FIG. 5 is an X-ray tomographic neutron-based diffraction report comparing the degree of crystallinity achieved in a densified, sintered graphite structure, fabricated according to method embodiments of the disclosure, to the degree of crystallinity of a standard of diamond.

Noting the large scale bulk homogeneity captured in X-ray tomography, neutron-based diffraction was reported (see FIG. 5) to respectively measure the coherence between formed layers, including the principle (002) and (110) reflections. Within FIG. 5, which uses neutron diffraction, the average diffraction profile shown in green is for the sintered graphite, while a standard of diamond is shown in orange. Notably, there was a high degree of crystallinity, and each peak position correctly identify with the crystalline standard provided for comparison.

The diffraction results shown and the diffraction parameters discussed herein have not been corrected for all the additional broadening factors inside a neutron beam, but are presented herein as being indicative of the extent of graphitization. Notwithstanding, the measured behavior is typical of graphitized carbon where the final calculated spacing of the (002) facet is at 3.358 Å; however, this is a little larger than the theoretical value for crystalline graphite of 3.354 Å, indicating the evaluated structure was fully graphitized for conditions employed. Whereas most of the structure was probably fully crystalline, small, disordered regions consisting of the larger turbostatic spacing (3.44 Å) may have been present, thus increasing the bulk averaged value, which agrees well with the microscopy observations discussed below.

Microstructure and Chemistry from High Resolution Electron Microscopy:

With reference to FIGS. 6A-6J, shown are a selection of STEM and high-resolution images from orthogonal directions. After considerable sampling, these are believed to be representative of the microstructures observed throughout the specimen of the sintered, densified graphite structure.

Site-specific focused ion beam (FIB) preparation lifted two electron transparent cross sections along the pressing direction (FIG. 6A) and from a direction perpendicular to pressing (FIG. 6B). From each of these directions, the underlying microstructure is indicated in the STEM images shown in FIG. 6C (via the direction of FIG. 6A) and FIG. 6D (via the direction of FIG. 6B). Along the pressing direction (FIG. 6A), the specimen was oriented to the preferred [002] direction for FIG. 6E to resolve the underlying atomic ordering. Perpendicular to the pressing direction (FIG. 6B), FIG. 6F resolves the underlying layering, where there is preferred orientation in sintering. Based on these two directions, the underlying atomic microstructure was resolved. There was preferred ordering and graphitization oriented along the pressing direction (FIG. 6A). Along the pressing direction (FIG. 6A), is it observable, from FIG. 6G, that the carbon atoms are oriented in this direction. In contrast, FIG. 6H clearly resolves the layering, where there are overlapping carbon shifts. For each of these conditions, selective area electron diffraction, shown in FIG. 6I and FIG. 6J, further corroborates the preferred texture and sintering along the pressing direction (FIG. 6A) and perpendicular to the pressing direction (FIG. 6B), respectively.

With reference to FIGS. 7A through 7E, shown are a selection of specimen diffraction patterns and chemical maps for carbon and residual oxygen derived from EELS. These are deemed, after considerable sampling, representative of the sintered, densified graphite structure specimen over a 3 µm by 5 µm cross-section.

In line with the previous results, the sample was observed along the pressing direction to resolve the carbon and residual oxygen chemistry. Over the area shown in FIG. 7A, STEM-based EELS measurements focused on the carbon and oxygen K edges to capture overall spatially-resolved composition and bonding.

Figure 7A:
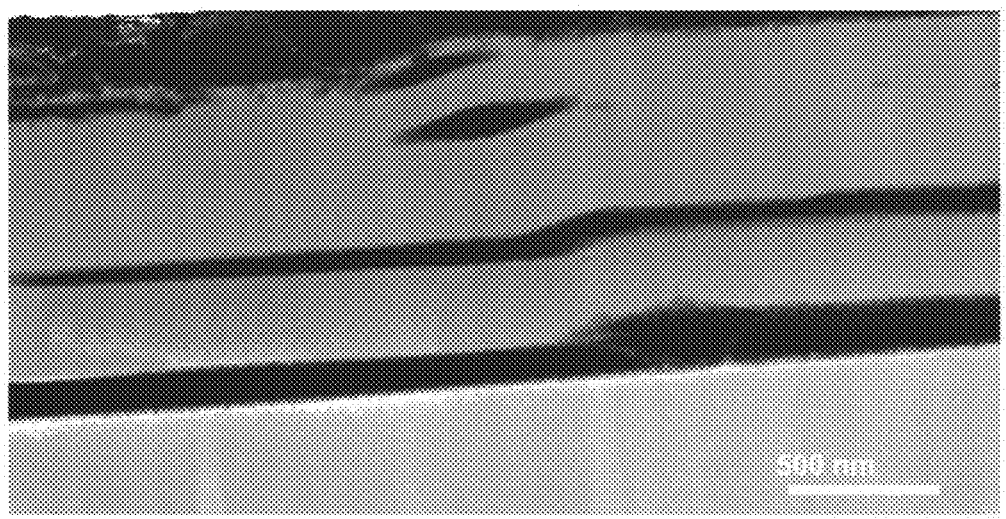
FIG. 7A is a STEM, high-resolution image of a specimen taken from a densified, sintered graphite structure, fabricated according to methods of the disclosure.
Figure 7B:
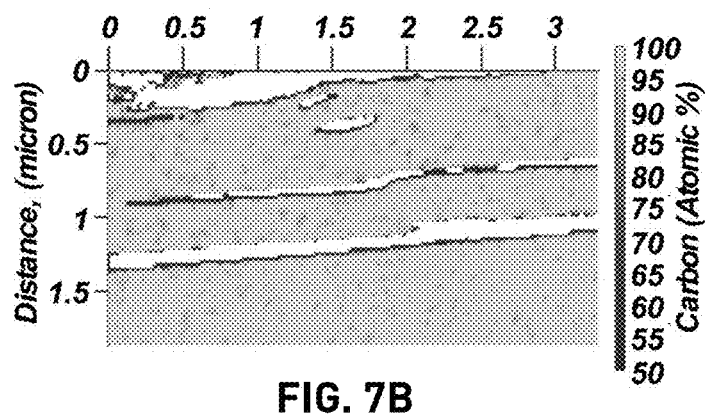
FIG. 7B plots the atomic elemental distribution for carbon in the specimen of FIG. 7A.
Figure 7C:
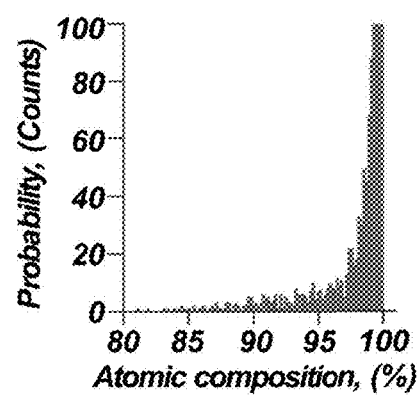
FIG. 7C is a compositional histogram, corresponding to the plot of FIG. 7B, for the atomic composition of carbon in the specimen of FIG. 7A.
Figure 7D:
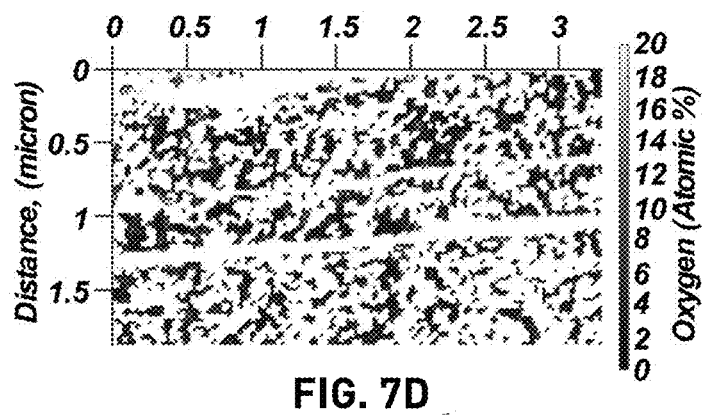
FIG. 7D plots the atomic elemental distribution for residual oxygen in the specimen of FIG. 7A.
Figure 7E:
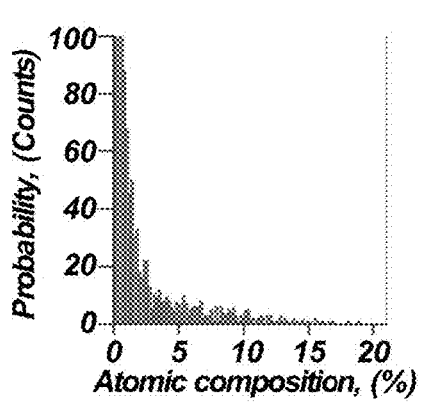
FIG. 7E is a compositional histogram, corresponding to the plot of FIG. 7D, for the atomic composition of residual oxygen in the specimen of FIG. 7A.

The overall composition derived from EELS are reflected in the chemical maps and associated compositional histograms of FIGS. 7B through 7E. FIG. 7B resolves the atomic elemental distribution for carbon, where FIG. 7C shows the compositional histogram for the carbon content by atomic percent. As shown, FIGS. 7B and 7C show a significant carbon composition at about 95 atomic percent. FIG. 7D shows the residual oxygen content measured below 20 atomic percent, with FIG. 7E being the accompanying compositional histogram based on the chemical map of FIG. 7D. More particularly, the residual oxygen from the sample being exposed was less than 5 atomic percent, with a strong peak centered at less than 1 atomic percent.

Figure 8A:
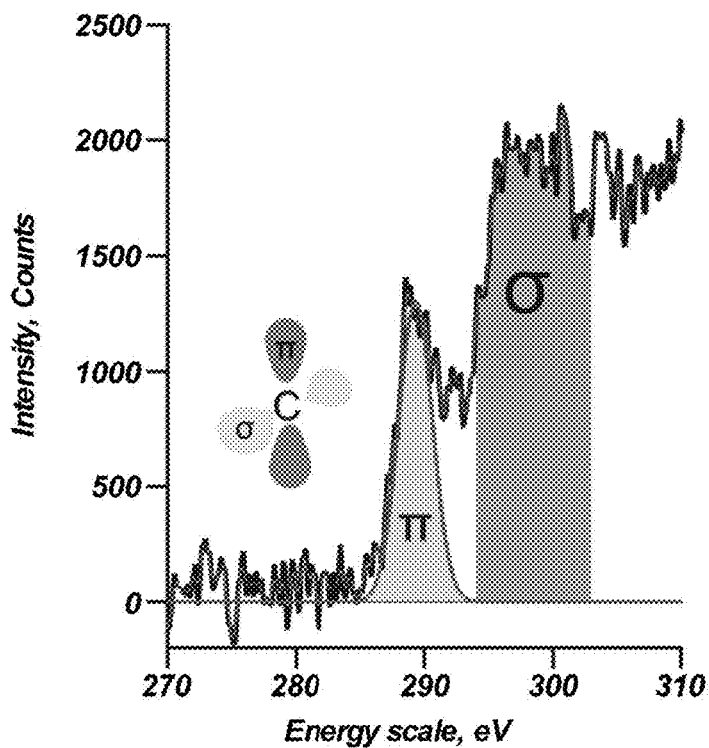
FIG. 8A plots, by energy scale (eV) versus intensity (counts), features contained within the C-K edge of a specimen from a densified, sintered graphite structure, fabricated according to methods of the embodiment.
Figure 8B:
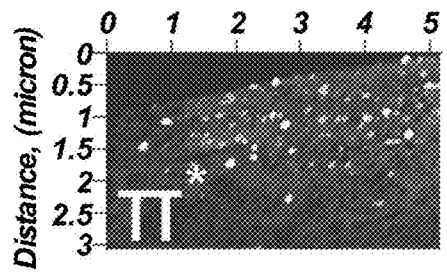
FIG. 8B is a STEM-based EEL scan of the C-K edge of FIG. 8A, indicating the $sp^2$-type bonding content within the specimen of FIG. 8A.

Evaluating the Local Carbonaceous Bonding in Sintered Graphite:

FIGS. 8A through 8E report on the carbon bonding state of the sintered graphite. Using STEM-based EELS, the state of carbon bonding was probed and reported based on the C-K edges. There are several features captured within the C-K EEL spectrum that may be attributed to interactions of the incident electrons with a carbonaceous bonding environment. The features contained within the C-K edge, shown in FIG. 8A, are due to energy losses incurred by the incident beam upon exciting an atomic 1 s electron to unoccupied anti-bonding-like states, just above the Fermi level. To some extent, it is appropriate to assume that the density of these unoccupied states is intrinsically linked to, and in some cases mirror, the density of the actual bonding orbitals. Qualitative comparison of C-K edge spectra obtained at each individual spatially resolved through the specimens provides an immediate means by which to evaluate the sp2- and sp3-like character in the sintered graphite specimen. In general, by applying two dimensional STEM-based EELS scans the near edge structure of the C-K edge was captured at each nanometer, leading to an ability to trace the bonding state associated with the sintered graphite specimens.

Figure 8C:
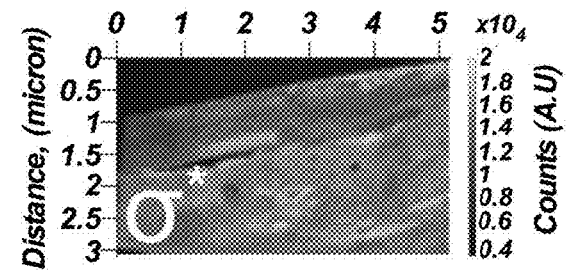
FIG. 8C is a STEM-based EEL scan of the C-K edge of FIG. 8A, indicating the $sp^3$-type bonding content within the specimen of FIG. 8A.
Figure 8D:
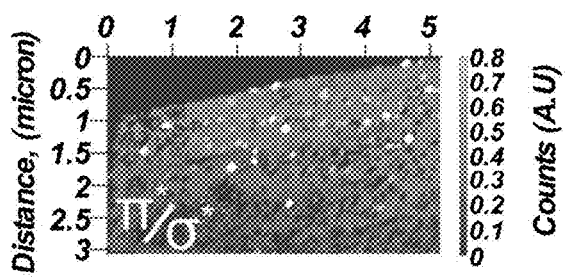
FIG. 8D is a STEM-based EEL scan of the C-K edge of FIG. 8A, indicating the relative ratio of the $sp^2$-type bonding content to the $sp^3$-type bonding content within the specimen of FIG. 8A.
Figure 8E:
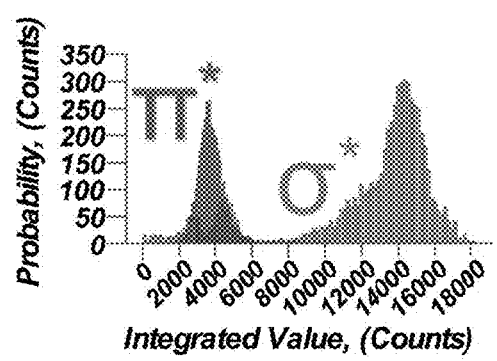
FIG. 8E is a histogram showing the distribution of the $sp^2$-type and the $sp^3$-type bonding in the specimen of FIG. 8A.

Applying this technique to track changes in the hybridization and the bonding nature of carbon species (e.g., the sp2-bonded carbon content), knowledge of EELS and non-linear least squares peak fitting was applied to quantify carbon content as well as the extent of spatially resolved sp2- and sp3-like bonding. As a function of integrated Gaussian centered over the principal edge at approximately 283 eV, FIG. 8B captures the nature of sp2-total content, where the Gaussian is fitted to greater than 95% confidence interval. Similarly over the integrated window from 297 eV to 304 eV, captured in FIG. 8C is the relative measure of the sp3-like nature of each point in the EELS multimodal dataset. Based on these two maps, FIG. 8D is the relative ratio of sp2- to sp3-like bonding, where there is distinctly one distribution for sp2- and three classes of sp3-like bonding represented in the total histogram of FIG. 8E. The lack of drastic changes in the ratios and total distribution leads to the outcome that, captured within the EELS two dimensional scans over a 3 µm by 5 µm area sampled within 1 nm resolution, there is a high degree of crystallinity found in the sample that is otherwise graphitized within and between the layers.

From the example above, it is verified that spark plasma sintering (SPS) is a viable alternative to sintering graphite. Using SPS does not require the multiple steps to fabricate graphite monoliths of the same or improved properties, including density, bonding, and overall microstructure. The SPS (or, otherwise known as, electrical field assisted sintering) requires far less fabrication steps than current graphite fabrication processes and combines pressing, sintering, and annealing into a single step with effectively shorter cycling times. The use of electrical field assisted sintering incurs far lower costs and far less consumables compared to conventional powder processing. SPS is capable of producing multiples of the same products, which is readily standardized through automation and control over a single press, which process is reproducible. Thus, the SPS methods of the disclosure provide an innovative and improved method for manufacturing high-density and high-purity graphite parts, which can positively impact several energy and technology industries going forward.

While the disclosed methods and apparatus are susceptible to various modifications and alternative forms in implementation thereof, specific embodiments have been shown by way of example in the drawings and have been described in detail herein. However, it should be understood that the present disclosure is not intended to be limited to the particular forms disclosed. Rather, the present disclosure encompasses all modifications, combinations, equivalents, variations, and alternatives falling within the scope of the present disclosure as defined by the following appended claims and their legal equivalents.

What is claimed is:

1. A method for fabricating a high-density graphite material, the method comprising subject a raw material comprising graphite to an electrical current, a temperature not exceeding 1200° C., and a pressure not exceeding about 300 MPa to sinter the raw material into a high-density graphite material having a carbon content of greater than about 95 atomic percent and exhibiting a density of greater than 2.0 g/cm$^3$.

2. The method of claim 1, further comprising selecting the raw material to comprise the graphite in powder form.

3. The method of claim 1, further comprising selecting the raw material to comprise graphite in natural flake form.

4. The method of claim 1, further comprising fabricating the high-density graphite material to define a graphite structure with a greatest outer dimension of at least 5 mm.

5. The method of claim 1, further comprising fabricating the high-density graphite material to define a graphite structure with a greatest outer dimension of at least 50 mm.

6. The method of claim 1, further comprising, prior to the subjecting, providing a die defining an opening and inserting the raw material in the opening of the die.

7. The method of claim 1, further comprising, prior to the subjecting, compacting the raw material.

8. The method of claim 1, further comprising, before the subjecting:
disposing, within an opening defined in a die, the raw material;
at least partially inserting inserts into the opening, the raw material disposed between opposing surfaces of the inserts; and
axially compressing the raw material between the opposing surfaces of the inserts.

9. The method of claim 8:
further comprising disposing, within the opening defined in the die, an other structure adjacent the raw material, wherein at least partially inserting inserts into the opening comprises:
at least partially inserting, into the opening, one of the inserts above the raw material and the other structure; and
at least partially inserting, into the opening, an other of the inserts below the raw material and the other structure, and
wherein axially compressing the raw material comprises axially compressing the raw material and the other structure between the opposing surfaces of the inserts.

10. The method of claim 9, further comprising, prior to disposing the other structure adjacent the raw material, providing the other structure to comprise a sintered material.

11. The method of claim 9, wherein disposing, within the opening defined in the die, the other structure adjacent the raw material comprises disposing the other structure and the raw material to be wholly received within the opening in the die.

12. The method of claim 1:
further comprising, before the subjecting:
disposing, within an opening defined in a die, the raw material between opposing surfaces of two structures, the opposing surfaces received within the opening; and
axially compressing the raw material between the opposing surfaces of the two structures,
wherein subjecting the raw material comprising graphite to the electrical current, the temperature not exceeding 1200° C., and the pressure not exceeding about 300 MPa sinters the raw material into the high-density graphite material to bond the two structures via the high-density graphite material.

13. The method of claim 1, further comprising selecting the raw material to comprise graphite and at least one metal material.

14. The method of claim 13, further comprising selecting the at least one metal material to comprise one or more of zirconium (Zr), nickel (Ni), iron (Fe), or chromium (Cr).

15. The method of claim 1, further comprising providing the raw material to comprise the graphite and at least one oxide material.

16. The method of claim 15, further comprising selecting the at least one oxide material to comprise at least one of uranium or plutonium.

17. The method of claim 1, wherein subjecting a raw material comprising graphite to an electrical current comprises subjecting the raw material to an electric current of from about 500 amperes to about 10,000 amperes.

18. The method of claim 1, wherein subjecting a raw material comprising graphite to an electrical current comprises subjecting the raw material to an applied electrical field of from about 4 V/cm to about 20 V/cm.

* * * * *